No. 689,469. Patented Dec. 24, 1901.
J. L. J. DOWNEN.
FARM GATE.
(Application filed May 8, 1901.)
(No Model.) 2 Sheets—Sheet 2.

Witnesses:
R. H. McClanahan
J R Davis

Inventor:
Joel. L. J. Downen

UNITED STATES PATENT OFFICE.

JOEL LEWIS JOHNSON DOWNEN, OF GREEN CITY, MISSOURI.

FARM-GATE.

SPECIFICATION forming part of Letters Patent No. 689,469, dated December 24, 1901.

Application filed May 3, 1901. Serial No. 58,603. (No model.)

*To all whom it may concern:*

Be it known that I, JOEL LEWIS JOHNSON DOWNEN, a citizen of the United States, residing at Green City, in the county of Sullivan and State of Missouri, have invented certain new and useful Improvements in Gates; and I do hereby declare the following to be a full, clear, and exact description of the invention, such as will enable any one to make and use the same.

The objects of my invention are to improve the construction of swinging gates and to provide a simple, cheap, and durable one capable of being easily opened and closed at a distance from each side of it to enable it to be operated by persons in vehicles or on horseback. I attain these objects by the mechanism illustrated in the accompanying drawings, in which—

Figure 1:
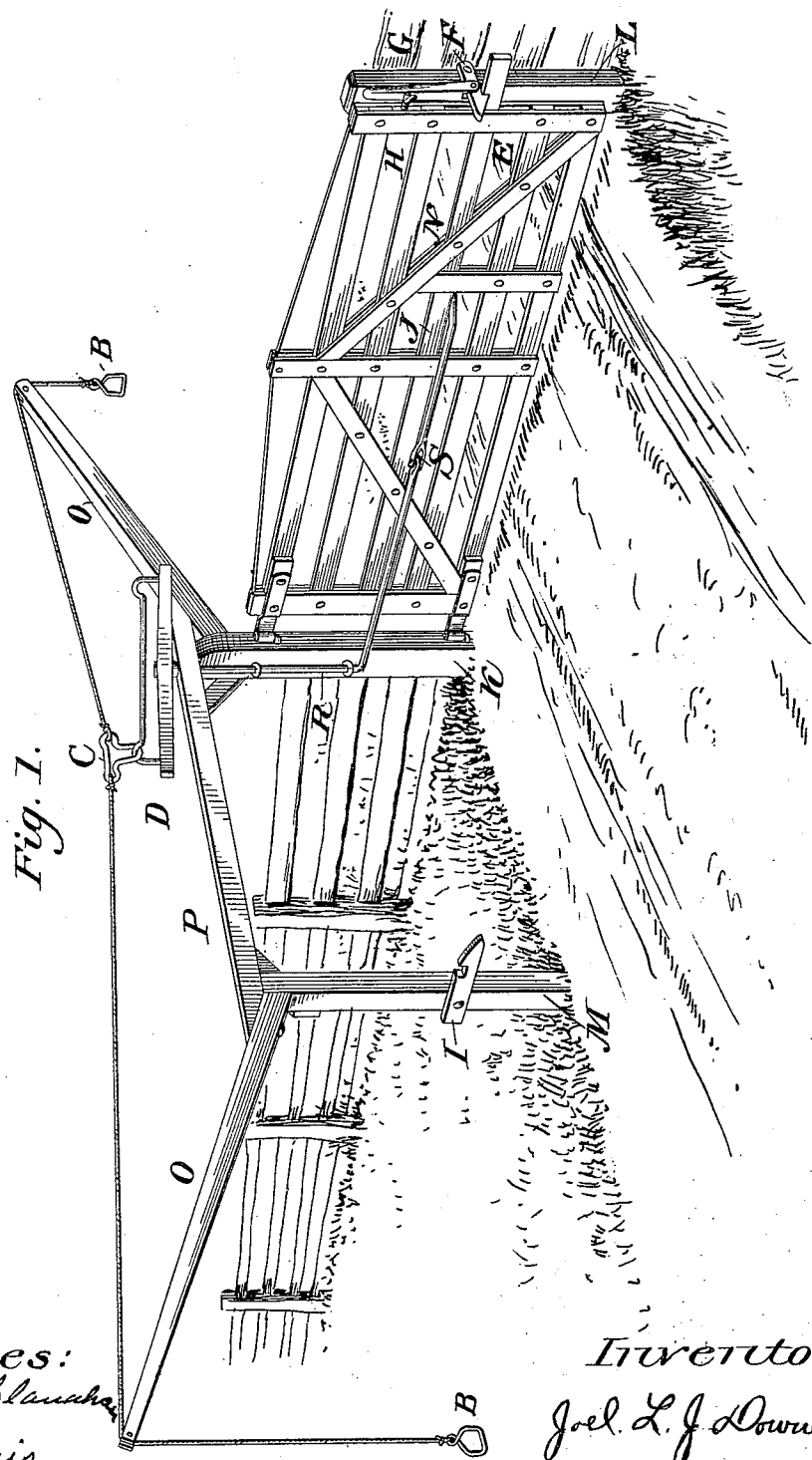
Figure 2:
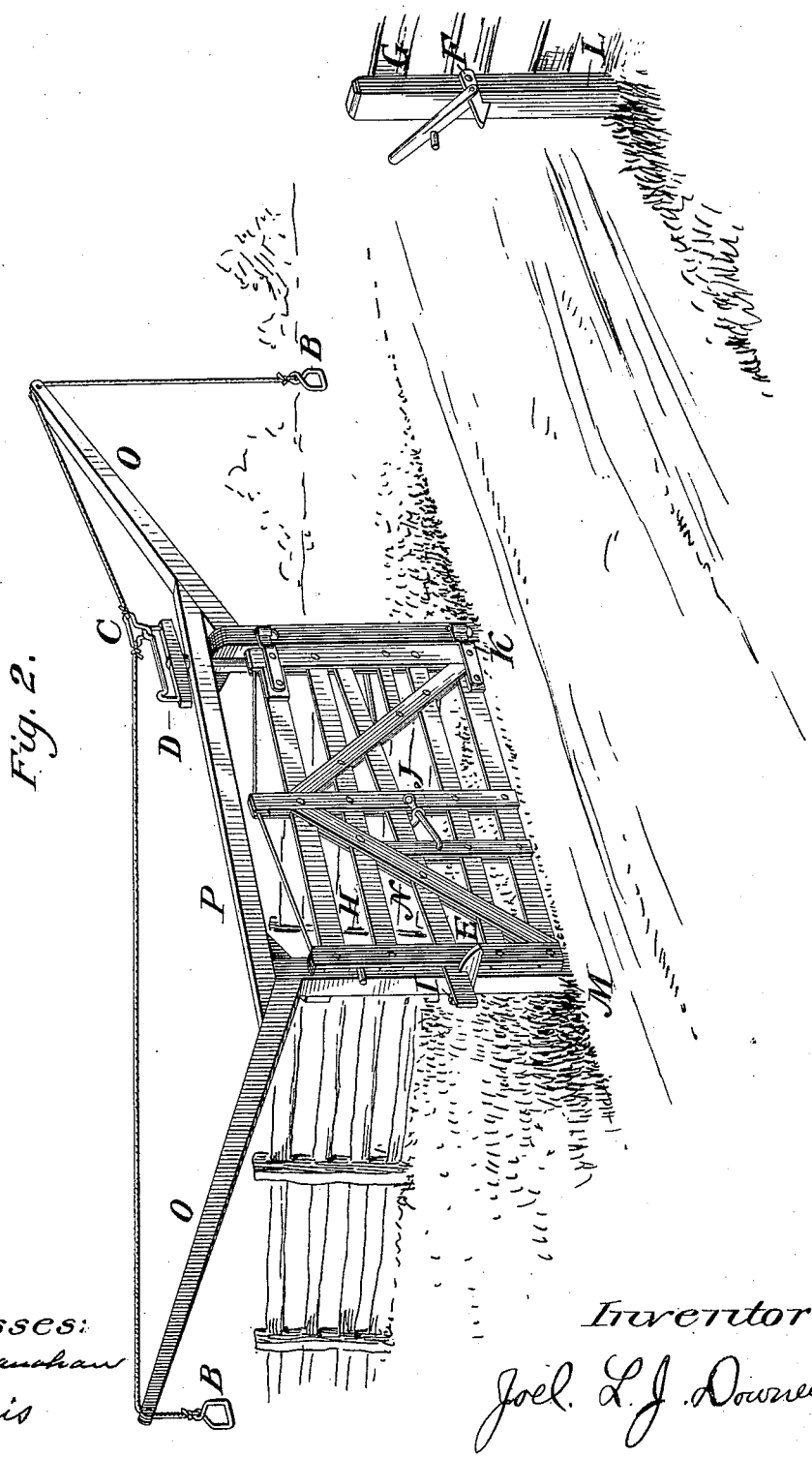

Figure 1 is a view of the gate in its closed position. Fig. 2 is a view of the gate in its open position.

Similar letters refer to similar parts throughout both views.

K is the hinge-post.

L and M are the two latch-posts.

P is a cross-tie connecting the top of posts K and M, and O designates arms supported by the posts and cross-tie which project obliquely in opposite directions along the road. Each of these arms carries a small pulley at its end. A cross-head D is rigidly attached to an angle-rod R, which passes through tie P and works in eyelets projecting from the side of post K. A guide-rod runs parallel with the upper side of the cross-head D and has a short upward crook near each end. This guide-rod passes through a triangular traveler C, and two cords having weighted handholds B are attached to opposite corners of the traveler and hang down over the pulleys in the ends of arms O to points within convenient reach of a passenger. Rod R is bent at a right angle below the eyelets on post K and then runs parallel with the center slat of the gate to a point one foot beyond the center of the gate-body, said rod having a bend near the outer end and an eye in the outermost end. Said rod has a hinge near the middle, (designated S,) which forms an elbow when the gate is open, for the purposes set forth. The support G is a short wooden upright having a pin projecting out and upward from the side near the upper end, forming a fork. The lower end of the upright is bolted to catch F, allowing the upper end to tilt outward. The catch is secured to post L, the notch being in the lower side, this end sloping downward. A similar catch is secured to post M, the notch being in the upper side.

The gate-body has an odd number of slats, and the braces running from the middle of the upper slat to the lower corners of the gate form an inverted-V brace. The center slat E of the gate is longer and has only one bolt through, which is nearer the front end at the point N where it crosses the front brace. A pin H, which projects at a proper height from the outer end of the gate, comes in contact with support G when the gate is swung shut, pushes it backward, and is caught on its fork, which thus supports the outer end of the gate and takes the strain from the hinges. The end of rod R passes under latch E to the opposite side of the gate, where it is secured by an oblique rod J, which passes through the eye of said rod and is attached to the middle upright of the gate and a short intermediate upright.

The operation of my gate is as follows: If the handhold approached by the passenger is raised, a downward pull releases the latch-slat E from the keeper F on post L and swings the gate around at a right angle; otherwise the passenger must first lift the handhold B and allow the triangle to be drawn to the opposite end of the guide-rod, after which a pull upon the same handle swings the gate around at a right angle, so that the projecting end of the latch-slat is caught and held by the keeper I on post M. Now passing through the gate and pulling the other handhold releases the latch-slat from the keeper and swings the gate shut. At the same time the pin H comes in contact with the support G, pushes it backward, and is caught upon its fork, which thus supports the outer end of the gate and takes the strain from the hinges.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

In a gate, the combination with the hinge-post K and the latch-posts L, M, of a gate provided with a latch-slat E; an angle-rod R, having a vertical arm journaled on post K, a jointed, horizontal arm extending along the gate and terminating with an eye; an oblique guide-rod passing through said eye, and secured below the latch-slat on the opposite side of the gate; a cross-bar having a guideway with terminal notches, rigidly attached to the head of the angle-rod; a traveler C, working in said guideway; and weighted cords attached to the traveler, and passing over pulleys at the ends of supporting-arms O, all substantially as shown.

In testimony whereof I have signed my name to this specification in the presence of two subscribing witnesses.

JOEL LEWIS JOHNSON DOWNEN.

Witnesses:
 JOHN H. SANTEE,
 THOMAS RANDOLPH DAVIS.